United States Patent
Koyama et al.

(10) Patent No.: US 12,535,465 B2
(45) Date of Patent: Jan. 27, 2026

(54) ULTRASONIC INSPECTION DEVICE AND ULTRASONIC INSPECTION UNIT

(71) Applicants: TOYOTA JIDOSHA KABUSHIKI KAISHA, Toyota (JP); NATIONAL UNIVERSITY CORPORATION NAGAOKA UNIVERSITY OF TECHNOLOGY, Nagaoka (JP)

(72) Inventors: Tomohiro Koyama, Toyota (JP); Ikuo Ihara, Nagaoka (JP); Shinji Wada, Nagaoka (JP)

(73) Assignees: TOYOTA JIDOSHA KABUSHIKI KAISHA, Toyota (JP); NATIONAL UNIVERSITY CORPORATION NAGAOKA UNIVERSITY OF TECHNOLOGY, Nagaoka (JP)

( * ) Notice: Subject to any disclaimer, the term of this patent is extended or adjusted under 35 U.S.C. 154(b) by 281 days.

(21) Appl. No.: 18/229,331

(22) Filed: Aug. 2, 2023

(65) Prior Publication Data
US 2024/0060938 A1   Feb. 22, 2024

(30) Foreign Application Priority Data
Aug. 18, 2022   (JP) .................................. 2022-130336

(51) Int. Cl.
*G01N 29/24*   (2006.01)
*G01N 29/07*   (2006.01)
*G01N 29/22*   (2006.01)

(52) U.S. Cl.
CPC ......... *G01N 29/2437* (2013.01); *G01N 29/07* (2013.01); *G01N 29/228* (2013.01);
(Continued)

(58) Field of Classification Search
CPC .. G01N 29/2437; G01N 29/07; G01N 29/228; G01N 2291/0251; G01N 2291/0421; G01N 29/043
See application file for complete search history.

(56) References Cited

U.S. PATENT DOCUMENTS

| | | | | |
|---|---|---|---|---|
| 4,397,194 A | * | 8/1983 | Soltz .................. | G01F 1/66 73/861.28 |
| 4,445,367 A | * | 5/1984 | Goldsmid ............. | G01N 3/42 374/45 |
| 5,955,671 A | * | 9/1999 | Gilmore ............... | G01N 29/36 73/620 |

FOREIGN PATENT DOCUMENTS

| | | |
|---|---|---|
| JP | S63-019551 A | 1/1988 |
| JP | H06-010668 B2 | 2/1994 |

(Continued)

OTHER PUBLICATIONS

Jen et al., "High Temperature Integrated Ultrasonic Shear Wave Probes," Applied Physics Letters, Oct. 2006, vol. 89, pp. 183506-1-183506-3.

*Primary Examiner* — Tarun Sinha
(74) *Attorney, Agent, or Firm* — Oliff PLC (57) ABSTRACT

An ultrasonic inspection device includes: a longitudinal ultrasonic sensor configured to emit and receive a longitudinal ultrasonic wave; and an ultrasonic transducer unit made of metal and having the shape of a polyhedron. The ultrasonic transducer unit includes: an output surface configured to be disposed facing an object to be inspected; an input surface on which the longitudinal ultrasonic sensor is disposed; and a conversion surface configured to, when the longitudinal ultrasonic wave input through the input surface is reflected by the conversion surface, convert the longitudinal ultrasonic wave into a transverse ultrasonic wave such that the transverse ultrasonic wave propagates toward the
(Continued)

output surface, the conversion surface being tilted at a predetermined angle with respect to an in-plane direction of the output surface. Thermal conductivity of the ultrasonic transducer unit is lower than thermal conductivity of the object to be inspected.

15 Claims, 3 Drawing Sheets

(52) U.S. Cl.
CPC ............... *G01N 2291/0251* (2013.01); *G01N 2291/0421* (2013.01)

(56) References Cited

FOREIGN PATENT DOCUMENTS

| JP | 2008-070340 A | 3/2008 |
| JP | 2022-112623 A | 8/2022 |

\* cited by examiner

| | SKD61 | SUS304 | 7/3 BRASS (C2600) | Ti-6Al-4V |
|---|---|---|---|---|
| MELTING POINT (°C) | 1644 | 1671 | 1189 | 1933 |
| THERMAL CONDUCTIVITY (W/(m·K)) | 42.2 | 15.0 | 119.0 | 8.0 |
| COEFFICIENT OF THERMAL EXPANSION ×10⁻⁶ (K⁻¹) | 10.8 | 17.3 | 19.9 | 8.4 |
| DENSITY (kg/m³) | 7750 | 8030 | 8530 | 4430 |
| LONGITUDINAL ULTRASONIC WAVE VELOCITY (m/s) | 5982 | 5670 | 4371 | 5755 |
| LONGITUDINAL ACOUSTIC IMPEDANCE (Mrayl) | 46.4 | 45.5 | 37.3 | 25.5 |
| TRANSVERSE ULTRASONIC WAVE VELOCITY (m/s) | 3253 | 3030 | 2203 | 3097 |
| TRANSVERSE ACOUSTIC IMPEDANCE (Mrayl) | 27.2 | 24.3 | 18.8 | 13.7 |
| RATIO OF TRANSVERSE ACOUSTIC IMPEDANCE BETWEEN SKD61 AND MATERIAL (SDK61/MATERIAL) | 1.00 | 1.12 | 1.45 | 1.99 |

REFERENCE: "JSME MECHANICAL ENGINEERS' HANDBOOK, SERIES β, DESIGN EDITION" EDITED BY THE JAPAN SOCIETY OF MECHANICAL ENGINEERS
* NUMERICAL VALUES ARE PHYSICAL PROPERTY VALUES AT ROOM TEMPERATURE.

ULTRASONIC INSPECTION DEVICE AND ULTRASONIC INSPECTION UNIT

CROSS-REFERENCE TO RELATED APPLICATION

This application claims priority to Japanese Patent Application No. 2022-130336 filed on Aug. 18, 2022, incorporated herein by reference in its entirety.

BACKGROUND

1. Technical Field

The present disclosure relates to ultrasonic inspection devices and ultrasonic inspection units.

2. Description of Related Art

There is known an inspection device that detects the state of solidification of molten metal based on the fact that a transverse ultrasonic wave does not pass through an unsolidified portion of molten metal (e.g., Japanese Unexamined Patent Application Publication No. S63-019551 (JP S63-019551 A)).

SUMMARY

Some ultrasonic sensors that emit a transverse ultrasonic wave have lower heat resistance than ultrasonic sensors that emit a longitudinal ultrasonic wave. Therefore, there is a demand for inspection devices that use a transverse ultrasonic wave but still can inspect a high-temperature object to be inspected.

The present disclosure can be implemented in the following forms.

An ultrasonic inspection device according to a first aspect of the present disclosure includes: a longitudinal ultrasonic sensor configured to emit and receive a longitudinal ultrasonic wave; and an ultrasonic transducer unit made of metal and having a shape of a polyhedron. The ultrasonic transducer unit includes: an output surface configured to be disposed facing an object to be inspected; an input surface on which the longitudinal ultrasonic sensor is disposed; and a conversion surface configured to, when the longitudinal ultrasonic wave input through the input surface is reflected by the conversion surface, convert the longitudinal ultrasonic wave into a transverse ultrasonic wave such that the transverse ultrasonic wave propagates toward the output surface, and the conversion surface being tilted at a predetermined angle with respect to an in-plane direction of the output surface. Thermal conductivity of the ultrasonic transducer unit is lower than thermal conductivity of the object to be inspected.

According to the ultrasonic inspection device of the first aspect of the present disclosure, the thermal conductivity of the ultrasonic transducer unit is set to be lower than that of the object to be inspected. It is therefore possible to reduce or prevent heat transfer from the object to be inspected to the longitudinal ultrasonic sensor through the ultrasonic transducer unit. It is therefore possible to obtain an inspection device that use a transverse ultrasonic wave but still can inspect a high-temperature object to be inspected.

In the ultrasonic inspection device of the first aspect of the present disclosure, a ratio of acoustic impedance of the object to be inspected to acoustic impedance of the ultrasonic transducer unit may be 0.5±0.1 or 2.0±0.1, acoustic impedance being a physical property value obtained by multiplying a density of an object by a speed of sound.

According to the ultrasonic inspection device of the first aspect of the present disclosure, a good balance can be achieved between transmission and reflection of the transverse ultrasonic wave at the interface between the object to be inspected and the ultrasonic transducer unit, and the accuracy of detection of a reflected wave by the ultrasonic inspection device can be improved.

In the ultrasonic inspection device of the first aspect of the present disclosure, a coefficient of thermal expansion of the ultrasonic transducer unit may be lower than a coefficient of thermal expansion of the object to be inspected.

According to the ultrasonic inspection device of the first aspect of the present disclosure, it is possible to reduce or prevent deformation of the ultrasonic transducer unit due to heat transfer from the object to be inspected.

In the ultrasonic inspection device of the first aspect of the present disclosure, the ultrasonic transducer unit may be made of a Ti-6Al-4V alloy.

According to the ultrasonic inspection device of the first aspect of the present disclosure, the ultrasonic transducer unit can be obtained by a simple method using a known material. In the ultrasonic inspection device of the first aspect of the present disclosure, the object to be inspected may include a mold having an internal space for forming a molded product, and a molding material introduced into the internal space.

According to the ultrasonic inspection device of the first aspect of the present disclosure, it is possible to obtain an ultrasonic inspection device that can acquire information on a molding material in a mold used in a molding machine etc.

In the ultrasonic inspection device of the first aspect of the present disclosure, the thermal conductivity of the ultrasonic transducer unit may be 100 W/m·K or less.

In the ultrasonic inspection device of the first aspect of the present disclosure, the thermal conductivity of the ultrasonic transducer unit may be 50 W/m·K or less.

In the ultrasonic inspection device of the first aspect of the present disclosure, the coefficient of thermal expansion of the ultrasonic transducer unit may be $20 \times 10^{-6}$/K or less.

In the ultrasonic inspection device of the first aspect of the present disclosure, the coefficient of thermal expansion of the ultrasonic transducer unit may be $12 \times 10^{-6}$/K or less.

An ultrasonic inspection unit according to a second aspect of the present disclosure includes: a longitudinal ultrasonic sensor configured to emit and receive a longitudinal ultrasonic wave; a mold having an internal space and configured such that a molding material is introduced into the internal space; and an ultrasonic transducer unit made of metal and having a shape of a polyhedron. The ultrasonic transducer unit includes: an output surface disposed facing the mold; an input surface on which the longitudinal ultrasonic sensor is disposed; and a conversion surface configured to, when the longitudinal ultrasonic wave input through the input surface is reflected by the conversion surface, convert the longitudinal ultrasonic wave into a transverse ultrasonic wave such that the transverse ultrasonic wave propagates toward the output surface, and the conversion surface being tilted at a predetermined angle with respect to an in-plane direction of the output surface. Thermal conductivity of the ultrasonic transducer unit is lower than thermal conductivity of the mold.

In the ultrasonic inspection unit of the second aspect of the present disclosure, a ratio of acoustic impedance of the mold to acoustic impedance of the ultrasonic transducer unit may be 0.5±0.1 or 2.0±0.1, acoustic impedance being a physical property value obtained by multiplying a density of an object by a speed of sound.

In the ultrasonic inspection unit of the second aspect of the present disclosure, a coefficient of thermal expansion of the ultrasonic transducer unit may be lower than a coefficient of thermal expansion of the mold.

The present disclosure can also be implemented in various forms other than the ultrasonic inspection device. For example, the present disclosure can be implemented in forms such as an ultrasonic inspection method, a method for manufacturing a molded product, a molding machine, a method for controlling the ultrasonic inspection device or the molding machine, a computer program for implementing the control method, and a non-transitory recording medium with the computer program recorded thereon.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A. First Embodiment

Figure 1:
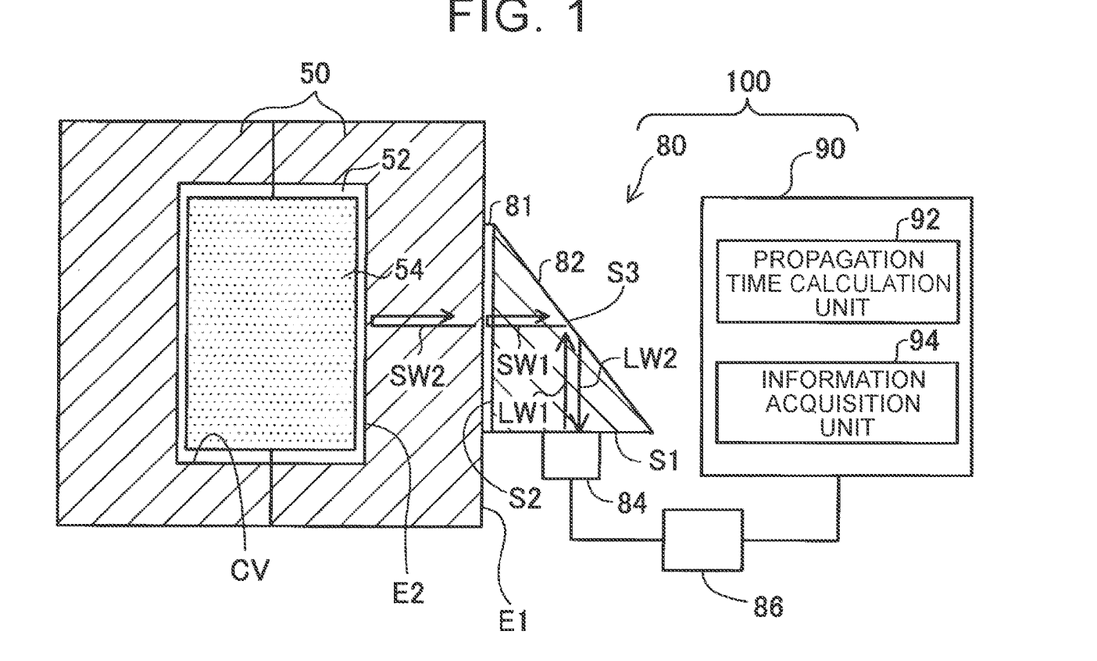
FIG. 1 illustrates a configuration of an ultrasonic inspection system.

FIG. 1 illustrates a configuration of an ultrasonic inspection system 100. The ultrasonic inspection system 100 includes an ultrasonic inspection device 80 according to a first embodiment of the present disclosure and a control device 90. The ultrasonic inspection system 100 is used by attaching the ultrasonic inspection device 80 to a mold 50 in a molding machine such as a die casting machine. The "molding machine" is a device that manufactures a molded product by injecting a molding material 54 into the mold 50 and solidifying the injected molding material 54. The "molding material" is, for example, a metal material before solidification that is in a liquid state or in a solid-liquid coexistence state. The metal material before solidification is also called "molten metal." Examples of the metal material include various materials such as aluminum, aluminum alloys, zinc alloys, magnesium alloys, and copper alloys. In the present embodiment, aluminum is used as the metal material, and the temperature of the molten metal is about 700° C. Examples of the molding machine may include, in addition to a die casting machine, various molding machines such as an injection molding machine using a resin material as the molding material.

The mold 50 can be made of, for example, alloy tool steel. In the present embodiment, the mold 50 is made of SKD61 (alloy tool steel material specified by the Japanese Industrial Standards JIS G 4404:2015). The mold 50 includes an outer wall E1 to which the ultrasonic inspection device 80 of the ultrasonic inspection system 100 is to be attached, and an inner wall E2 defining an internal space CV. A mold release agent 52 is applied to the inner wall E2 of the mold 50. The mold 50 can be opened and closed by a mold clamping device, not shown. The internal space CV having substantially the same shape as a molded product is formed inside the mold 50 closed by clamping by the mold clamping device. The internal space CV is also called a cavity. The metal material before solidification is injected into the internal space CV of the mold 50 by an injection device, not shown, to fill the internal space CV. The molding material 54 before solidification filling the internal space CV is cooled and solidified as its heat is absorbed by the mold 50 etc. As a result, a molded product is formed.

In the present embodiment, objects to be inspected include the mold 50, the molding material 54 in the internal space CV of the mold 50, and the mold release agent 52 in the internal space CV of the mold 50. The ultrasonic inspection device 80 is not limited to the example in which it is used for the mold and the molding material. The ultrasonic inspection device 80 may be used to acquire information on any desired structure and the internal state of the structure, such as the state of oil and state of fuel inside a cylinder block and the temperatures of the oil and fuel.

The ultrasonic inspection device 80 includes an adhesive layer 81, an ultrasonic transducer unit 82, a longitudinal ultrasonic sensor 84, and a high-speed analog-to-digital (A-D) converter 86. The adhesive layer 81 bonds the mold 50 and the ultrasonic inspection device 80 together. The adhesive layer 81 may be a silver paste or a metal thin film. The mold 50 may be fixed to the ultrasonic inspection device 80 with bolts etc. instead of or in addition to the adhesive layer 81. A couplant for improving ultrasonic transmission properties at the contact surface between the ultrasonic transducer unit 82 and the longitudinal ultrasonic sensor 84 may be applied between the ultrasonic transducer unit 82 and the longitudinal ultrasonic sensor 84. The couplant may be, for example, a silver paste or a metal thin film such as gold. In the case where the contact surface between the ultrasonic transducer unit 82 and the longitudinal ultrasonic sensor 84 is sufficiently low, the couplant may be water, glycerin, etc.

The longitudinal ultrasonic sensor 84 is a probe using a piezoelectric element, and emits and receives a longitudinal ultrasonic wave. The "longitudinal ultrasonic wave" is an ultrasonic wave in which a medium vibrates in the same direction as the direction of wave propagation, and the "transverse ultrasonic wave" is an ultrasonic wave in which a medium vibrates in a direction perpendicular to the direction of wave propagation. The longitudinal ultrasonic sensor 84 may have high heat resistance from the standpoint that it is used to inspect high-temperature objects to be inspected, such as the mold 50. In the present embodiment, the heat resistant temperature of the longitudinal ultrasonic sensor 84 is about 500° C., which is lower than the temperature of the molten metal. The heat resistant temperature of a transverse ultrasonic sensor for emitting a transverse ultrasonic wave is, for example, about 120° C., which is typically lower than the heat resistant temperature of a longitudinal ultrasonic sensor.

As will be described later, the ultrasonic transducer unit 82 is a metal structure having the shape of a polyhedron. The longitudinal ultrasonic sensor 84 is attached to the ultrasonic transducer unit 82. The ultrasonic transducer unit 82 converts a longitudinal ultrasonic wave emitted from the longitudinal ultrasonic sensor 84 into a transverse ultrasonic wave, and outputs the transverse ultrasonic wave to an object to be inspected. The ultrasonic transducer unit 82 avoids the longitudinal ultrasonic sensor 84 being directly attached to the object to be inspected, and reduces or prevents direct heat transfer from the object to be inspected to the longitudinal ultrasonic sensor 84.

The ultrasonic transducer unit 82 has three surfaces: an input surface S1, an output surface S2, and a conversion surface S3. The input surface S1 is a surface to which the longitudinal ultrasonic sensor 84 is attached, and a longitudinal ultrasonic wave is input from the longitudinal ultrasonic sensor 84 to the input surface S1. From the standpoint of reducing exposure of the longitudinal ultrasonic sensor 84 to a high temperature environment, the longitudinal ultrasonic sensor 84 may be attached at a position separated from the molding material 54 and the mold 50.

The output surface S2 is a surface disposed facing the mold 50. "Disposed facing the mold 50" includes the state in which the output surface S2 faces and is contact with the mold 50, and the state in which the output surface S2 faces the mold 50 and is in contact with the mold 50 with a medium such as the adhesive layer 81 interposed therebetween. The conversion surface S3, when the longitudinal ultrasonic wave input through the input surface S1 is reflected by the conversion surface S3, converts the longitudinal ultrasonic wave into a transverse ultrasonic wave such that the transverse ultrasonic wave propagates toward the output surface S2. The three surfaces, namely the input surface S1, the output surface S2, and the conversion surface S3, need not necessarily be flat surfaces, and may be curved surfaces as long as they have the above functions. However, from the standpoint of smooth propagation of ultrasonic waves at the interface between objects, these surfaces may be flat surfaces.

As shown by arrow LW1 in FIG. 1, the longitudinal ultrasonic wave emitted from the longitudinal ultrasonic sensor 84 to the ultrasonic transducer unit 82 through the input surface S1 propagate toward the conversion surface S3. As shown by arrow SW1, the longitudinal ultrasonic wave is converted into a transverse ultrasonic wave when reflected by the conversion surface S3, and the transverse ultrasonic wave propagates toward the output surface S2. Part of the transverse ultrasonic wave having propagated toward the output surface S2 are reflected by the outer wall E1 and propagate toward the conversion surface S3. As shown by arrow LW2, the transverse ultrasonic wave reflected by the outer wall E1 is reflected by the conversion surface S3 and converted into a longitudinal ultrasonic wave, and the longitudinal ultrasonic wave is received by the longitudinal ultrasonic sensor 84. As shown by arrow SW2, the transverse ultrasonic wave input to the mold 50 without being reflected by the outer wall E1 is reflected by the inner wall E2, the mold release agent 52, or the molding material 54. The transverse ultrasonic wave reflected by the inner wall E2 etc. propagates through the mold 50, is input to the ultrasonic transducer unit 82, and propagates toward the conversion surface S3. As shown by arrow LW2, the transverse ultrasonic wave reflected by the conversion surface S3 is converted into a longitudinal ultrasonic wave, and the longitudinal ultrasonic wave is received by the longitudinal ultrasonic sensor 84. As described above, the ultrasonic inspection device 80 can convert a longitudinal ultrasonic wave into a transverse ultrasonic wave through the ultrasonic transducer unit 82. An inspection using a transverse ultrasonic wave can thus be carried out with the longitudinal ultrasonic sensor 84.

An analog voltage signal corresponding to the waveform of the longitudinal ultrasonic wave output from the longitudinal ultrasonic sensor 84 is input to the high-speed A-D converter 86. The high-speed A-D converter 86 converts the input analog voltage signal into a digital signal, and outputs the digital signal to the control device 90. The high-speed A-D converter 86 may be provided in the longitudinal ultrasonic sensor 84 or the control device 90.

The control device 90 is a microcomputer that includes a microprocessor for performing logical operations and a memory such as a read-only memory (ROM) and a random access memory (RAM). The microprocessor can perform the functions of each unit provided in the present embodiment by executing programs stored in advance in the memory. In the present embodiment, the microprocessor functions as a propagation time calculation unit 92 and an information acquisition unit 94 by executing the programs stored in the memory. The control device 90 may further control the operation of each part of the die casting machine such as the mold 50. Part or all of the functions of each unit such as the propagation time calculation unit 92 and the information acquisition unit 94 may be implemented by hardware circuitry. The propagation time calculation unit 92 and the information acquisition unit 94 may be provided in the high-speed A-D converter 86.

The propagation time calculation unit 92 calculates the propagation time from when the longitudinal ultrasonic sensor 84 emits a longitudinal ultrasonic wave until the longitudinal ultrasonic sensor 84 detects the longitudinal ultrasonic wave as a reflected wave. The information acquisition unit 94 acquires information on the object to be inspected by using the propagation time of the ultrasonic wave obtained by the propagation time calculation unit 92. The information acquisition unit 94 acquires the temperature distribution in the object to be inspected based on a theoretical formula by using, for example, the propagation time of the ultrasonic wave and the physical property values of the object to be inspected including the thermal conductivity of the object to be inspected. The theoretical formula for calculating the temperature distribution may be, for example, a theoretical formula disclosed in Japanese Unexamined Patent Application Publication No. 2008-70340 (JP 2008-70340 A). The information acquisition unit 94 may use a data table showing the relationship between the propagation time of the ultrasonic wave and the temperature of the object to be inspected, instead of the theoretical formula. The information acquired by the information acquisition unit 94 is not limited to the temperature distribution in the object to be inspected, but may include the progress of solidification of the material inside the object to be inspected, whether there is an object contacting the inner wall E2 of the mold 50, and whether the Leidenfrost phenomenon has occurred inside the mold 50. The Leidenfrost phenomenon means a phenomenon in which a liquid droplet evaporates when it encounters a solid surface with a temperature equal to or higher than its saturation temperature.

Figure 2:
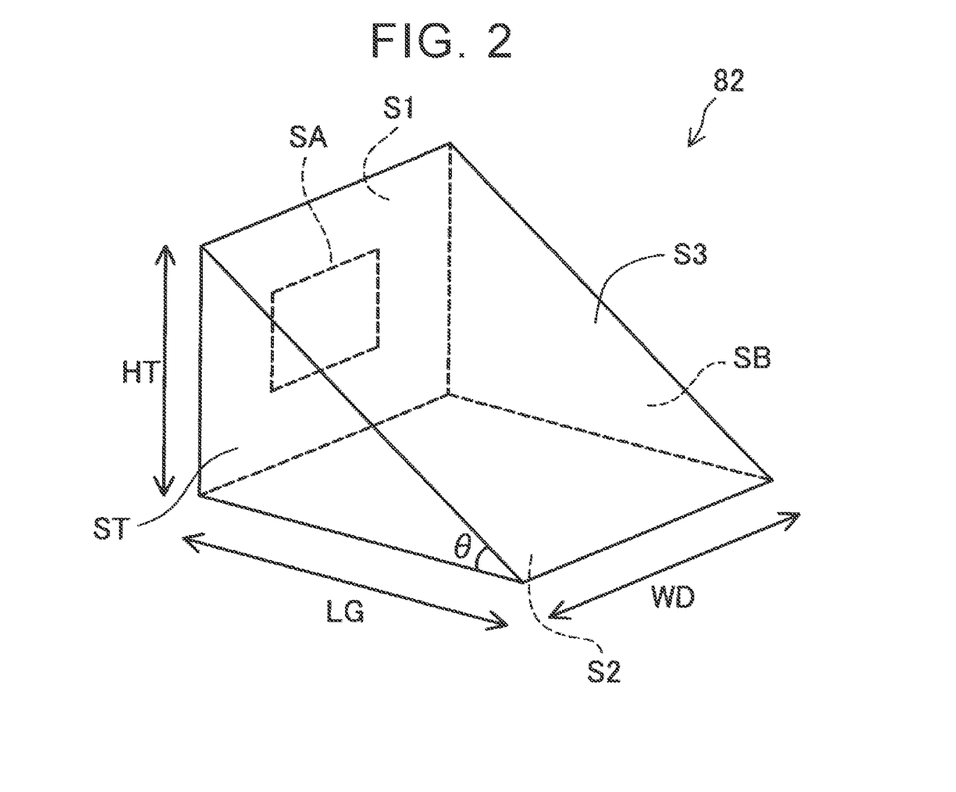
FIG. 2 illustrates a schematic configuration of an ultrasonic transducer unit.

A method for producing the ultrasonic transducer unit 82 will be described with reference to FIGS. 2 and 3. FIG. 2 illustrates a schematic configuration of the ultrasonic transducer unit 82. In the example of FIG. 2, the external shape of the ultrasonic transducer unit 82 is substantially a triangular prism having a right triangular top ST and a right triangular bottom SB with the angle θ between the output surface S2 and the conversion surface S3 set as desired. The ultrasonic transducer unit 82 can be formed by, for example, molding a metal material using a mold or cutting a metal material. In the present embodiment, the width WD is set to 50.0 millimeters, the length LG is set to 47.4 millimeters, and the height HT is set to 24.0 millimeters. However, the dimensions of the edges are not limited to these values, and may be set to desired values. The input surface S1, the output surface S2, and the conversion surface S3 may not be connected to each other. The shape of the ultrasonic transducer unit 82 is not limited to a triangular prism, and may be any desired polyhedron having the three surfaces: the input surface S1, the output surface S2, and the conversion surface S3.

The longitudinal ultrasonic sensor 84 is attached to a partial area SA of the input surface S1. The propagation direction of the longitudinal ultrasonic wave emitted from the longitudinal ultrasonic sensor 84 is set to be perpendicular to the in-plane direction of the input surface S1.

The angle θ shown in FIG. 2 is defined by the output surface S2 and the conversion surface S3. The angle θ is set so that the input longitudinal ultrasonic wave can be converted into a transverse ultrasonic wave and that the propagation direction of the converted transverse ultrasonic wave is perpendicular to the in-plane direction of the output surface S2. In the present embodiment, the angle θ is calculated by the following equation (1).

$$\text{Angle } \theta = 90 \text{ Arctan(longitudinal ultrasonic wave velocity/transverse ultrasonic wave velocity)} \quad (1)$$

Actual measured values obtained by using the material of the ultrasonic transducer unit 82 before processing were used as the longitudinal ultrasonic wave velocity and transverse ultrasonic wave velocity in the equation (1) in order to reduce the influence of the individual differences of the material. That is, these values can be regarded as values in the ultrasonic transducer unit 82. In the present embodiment, as will be described later, Ti-6Al-4V (JIS class 60) is used as the material of the ultrasonic transducer unit 82. The actual measured value of the longitudinal ultrasonic wave velocity is 6277.7 m/s, and the actual measured value of the transverse ultrasonic wave velocity was 3175.5 m/s. The angle θ was set to 26.832 degrees derived from these actual measured values and the equation (1). The longitudinal ultrasonic wave velocity and the transverse ultrasonic wave velocity may be other values such as known physical property values, instead of the actual measured values.

Figure 3:
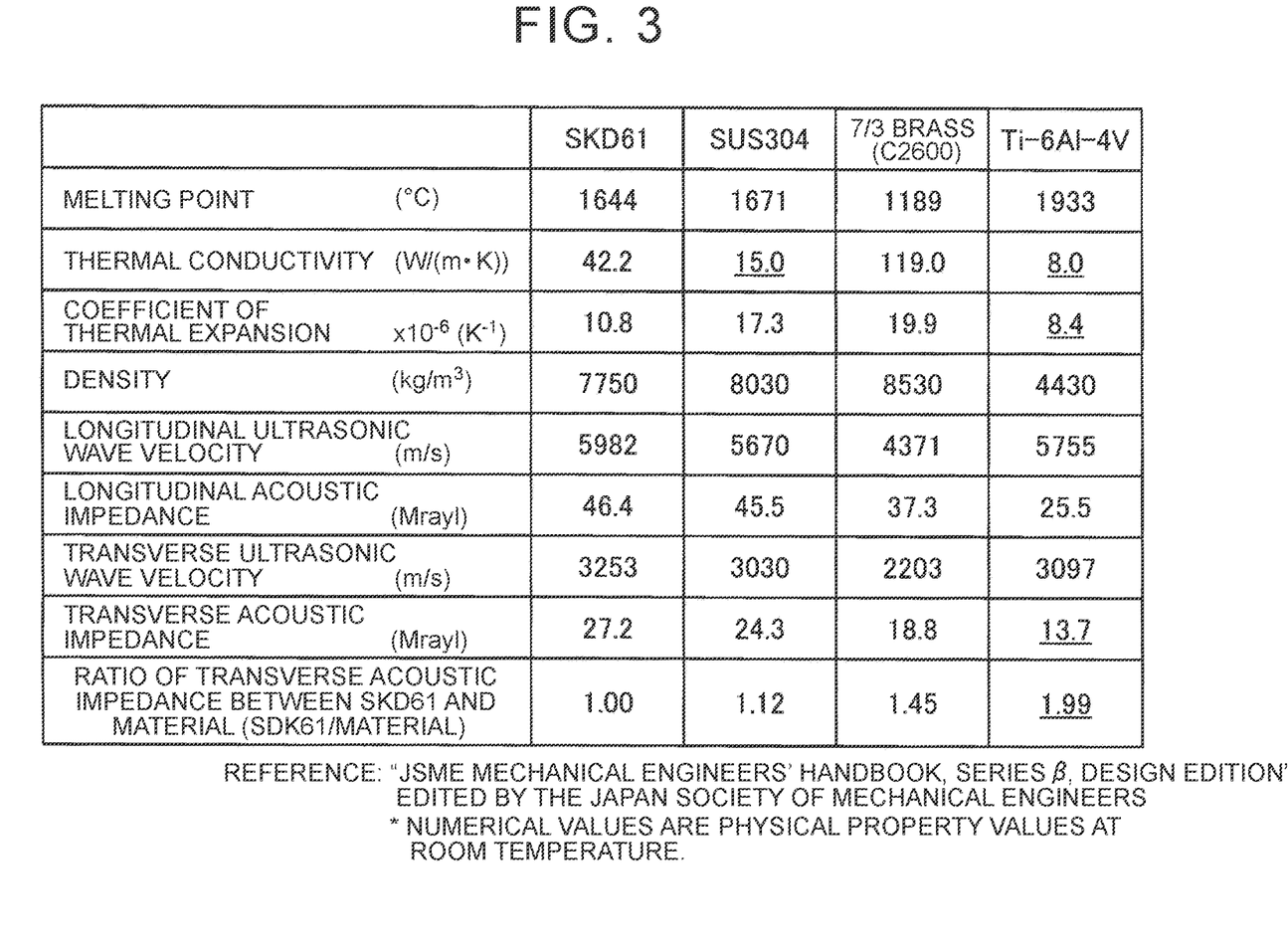
FIG. 3 is a table showing an example of physical property values referred to when producing the ultrasonic transducer unit.

FIG. 3 is a table showing an example of the physical property values referred to when producing the ultrasonic transducer unit 82. The table shown in FIG. 3 shows the types of metal materials and the physical property values of each metal material. The physical property values of each metal material are known values, and "JSME Mechanical Engineers' Handbook, Series β, Design Edition" edited by The Japan Society of Mechanical Engineers was referred to in the present embodiment. Although the physical property values are physical property values at room temperature, the present disclosure is not limited to this, and physical property values at the temperature in the use environment may be used. In order to facilitate understanding of the technique, numerical values that are focused on in the following description are underlined in FIG. 3.

Regarding the types of metal materials, SKD61 that is the material of the mold 50 to be inspected is shown in the leftmost column for comparison. Examples of the metal materials selected as candidate materials of the ultrasonic transducer unit 82 are shown in the columns to the right of the column of SKD61. The following conditions were considered to select the material of the ultrasonic transducer unit 82.

(1) Capable of reducing or preventing heat transfer from the object to be inspected to the longitudinal ultrasonic sensor 84.

(2) Capable of reducing or preventing deformation of the ultrasonic transducer unit 82 due to heat transfer from the object to be inspected.
(3) Having a good balance between transmission and reflection of the transverse ultrasonic wave at the interface between the object to be inspected and the ultrasonic transducer unit 82.

In order to satisfy the above condition (1), the material may have low thermal conductivity. In the present embodiment, materials with lower thermal conductivity than the material of the object to be inspected (in the present embodiment, SKD61) were selected. In the example of FIG. 3, the materials with lower thermal conductivity than SKD61 are stainless steel (SUS304) and Ti-6Al-4V. "Ti-6Al-4V" is an α-β type titanium alloy, and is a titanium alloy obtained by adding 6 mass % of aluminum and 4 mass % of vanadium to titanium. In the present disclosure, Ti-6Al-4V is also referred to as "64 titanium." The thermal conductivity of the ultrasonic transducer unit 82 need not necessarily be lower than that of the object to be inspected, and may be, for example, 100 W/m·K or less as long as heat transfer from the object to be inspected to the longitudinal ultrasonic sensor 84 is reduced. The thermal conductivity of the ultrasonic transducer unit 82 may be 50 W/m·K or less from the standpoint of sufficiently reducing heat transfer from the object to be inspected to the longitudinal ultrasonic sensor 84. The thermal conductivity of the ultrasonic transducer unit 82 may be set to be lower than the thermal conductivities of common metals such as carbon steel, chromium steel, and manganese steel.

In order to satisfy the above condition (2), the material may have a low coefficient of thermal expansion. In the present embodiment, a material with a lower coefficient of thermal expansion than SKD61 was selected. In the example of FIG. 3, 64 titanium is the only material with a lower coefficient of thermal expansion than SKD61. For example, when deformation of the ultrasonic transducer unit 82 has only a small impact on the detection accuracy of the longitudinal ultrasonic sensor 84, the coefficient of thermal expansion of the ultrasonic transducer unit 82 may be $20 \times 10^{-6}$/K or less. The coefficient of thermal expansion of the ultrasonic transducer unit 82 may be $12 \times 10^{-6}$/K or less from the standpoint of reducing the impact of deformation of the ultrasonic transducer unit 82 on the detection accuracy of the longitudinal ultrasonic sensor 84. The coefficient of thermal expansion of the ultrasonic transducer unit 82 may be set to be lower than the coefficients of thermal expansion of common metals such as carbon steel, chromium steel, and manganese steel.

In order to satisfy the above condition (3), there may be a suitable difference between the transverse acoustic impedance of the material to be inspected (SKD61) (that is, the transverse acoustic impedance of the mold 50) and the transverse acoustic impedance of the material of the ultrasonic transducer unit 82. The "acoustic impedance" means a physical property value obtained by multiplying the density of an object by the speed of sound. When the difference in transverse acoustic impedance between the object to be inspected and the ultrasonic transducer unit 82 is large, an ultrasonic wave tends to be reflected by the surface of the object to be inspected (outer wall E1 in the example of FIG. 1), and are less likely to be transmitted into the object to be inspected. When the difference in transverse acoustic impedance therebetween is small, an ultrasonic wave tends to be transmitted into the object to be inspected, but are less likely to be reflected. In the present embodiment, it was experimentally found by simulation that a good balance between reflection and transmission of a transverse ultrasonic wave is achieved when the ratio of the transverse acoustic impedance of the object to be inspected to the transverse acoustic impedance of the ultrasonic transducer unit 82 is about 0.5 or about 2.0. The ratio of the transverse acoustic impedance can be set to 0.5±0.1 or 2.0±0.1 in order to allow for variations in physical property values among materials and measurement errors. In the example of FIG. 3, 64 titanium is the only material that satisfies the ratio of the transverse acoustic impedance of 2.0±0.1. As described above, in the present embodiment, 64 titanium was selected for the ultrasonic transducer unit 82 as a material that satisfies all of the above conditions (1) to (3).

Figure 4:
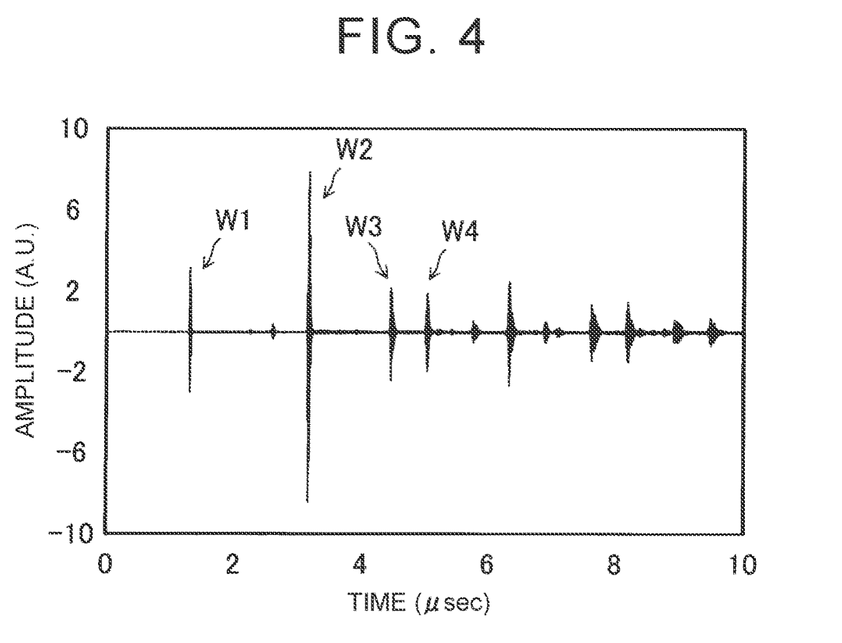
FIG. 4 is a graph showing first experimental results obtained by an ultrasonic inspection device.

Characteristics of the produced ultrasonic transducer unit 82 will be described with reference to FIGS. 4 and 5. FIG. 4 is a graph showing first experimental results obtained by the ultrasonic inspection device 80 using the produced ultrasonic transducer unit 82. In FIG. 4, the abscissa represents the time elapsed from the point at which a longitudinal ultrasonic wave was emitted (unit: IA second), and the ordinate represents the amplitude of a reflected wave (arbitrary unit). A reflected wave W1 shown in FIG. 4 indicates an ultrasonic wave reflected by the interface between the mold 50 and the ultrasonic transducer unit 82, that is, the outer wall E1 (in the example of FIG. 1, an ultrasonic wave shown by arrow SW1). A reflected wave W2 indicates an ultrasonic wave transmitted into the mold 50 and reflected by the inner wall E2 (in the example of FIG. 1, an ultrasonic wave indicated by arrow SW2).

In order for the information acquisition unit 94 to acquire information on the object to be inspected, such as the propagation time of a transverse ultrasonic wave and the temperature distribution in the mold 50, each of the reflected waves W1, W2 may have a sufficient amplitude or intensity. It can be understood from the detection results shown in FIG. 4 that each of the reflected waves W1, W2 has a sufficient amplitude. A reflected wave W3 indicates an ultrasonic wave transmitted into the mold 50 and reflected by the inner wall E2 after traveling back and forth twice within the ultrasonic transducer unit 82, being reflected by the input surface S1, and being reflected by the conversion surface S3 toward the output surface S2. A reflected wave W4 indicates an ultrasonic wave having traveled back and forth twice within the mold 50 after converted into a transverse ultrasonic wave in the ultrasonic transducer unit 82.

Figure 5:
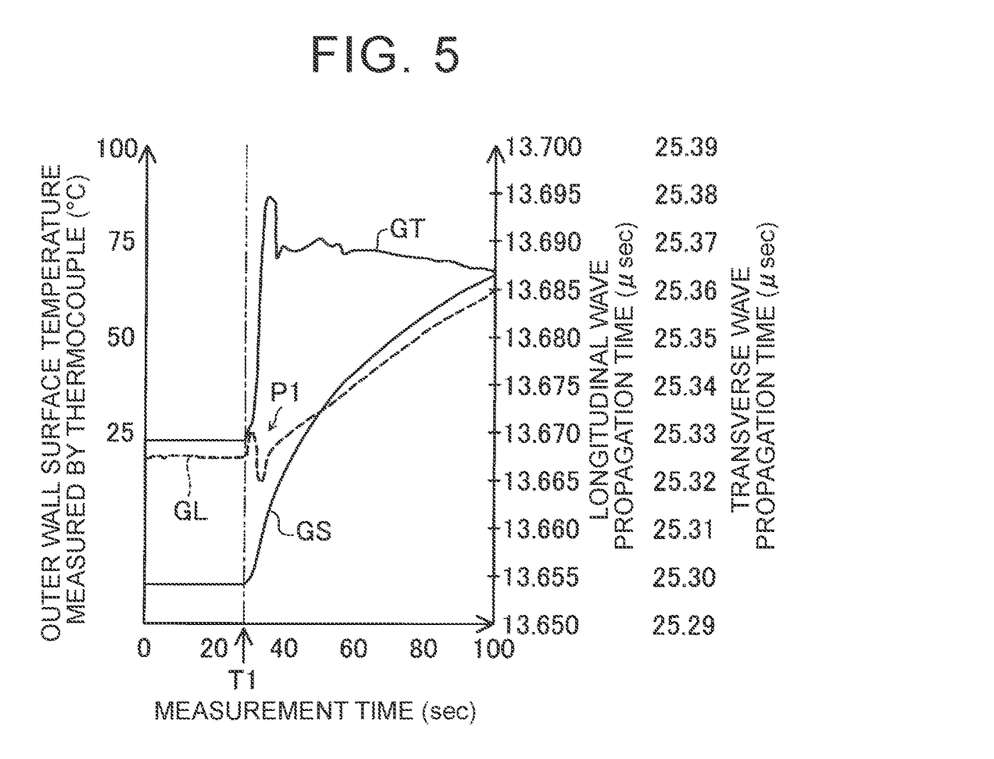
FIG. 5 is a graph showing second experimental results obtained by the ultrasonic inspection device.

FIG. 5 is a graph showing second experimental results obtained by the ultrasonic inspection device 80 using the produced ultrasonic transducer unit 82. The abscissa represents time, and the ordinate on the right side of the graph represents the propagation time of a longitudinal ultrasonic wave and the propagation time of a transverse ultrasonic wave. The "propagation time of longitudinal ultrasonic wave" and the "propagation time of transverse ultrasonic wave" are expressions for convenience, and mean the propagation times of the ultrasonic wave before and after conversion using the ultrasonic transducer unit 82, respectively. The ordinate on the left side of the graph indicates the surface temperature of the outer wall E1 measured by a thermocouple. In this experiment, the mold 50 and the ultrasonic inspection system 100 shown in FIG. 1 were used, and a longitudinal ultrasonic sensor similar to the longitudinal ultrasonic sensor 84 was used for comparison. The longitudinal ultrasonic sensor for comparison was attached directly to the outer wall E1 of the mold 50 without using the ultrasonic transducer unit 82. In this experiment, molten metal at about 150° C. that is equal to or lower than the heat resistance temperature was used in order to suppress failure of the longitudinal ultrasonic sensor for comparison. In the present embodiment, a thermocouple for obtaining the surface temperature of the mold 50 is placed on the outer wall E1.

The control device 90 controls the longitudinal ultrasonic sensor 84 and the longitudinal ultrasonic sensor for comparison for a predetermined period of time such as 100 seconds to steadily emit a longitudinal ultrasonic wave. The longitudinal ultrasonic sensor 84 and the longitudinal ultrasonic sensor for comparison repeatedly detect a reflected wave from the inner wall E2, and the control device 90 obtains the propagation time of each reflected wave. At time T1 that is about 30 seconds after the start of the experiment, the molten metal is introduced into the internal space CV of the mold 50.

FIG. 5 shows graphs GT, GL, and GS. The graph GT shows the change in surface temperature of the outer wall E1 measured by the thermocouple. The graph GL shows the change in propagation time of the longitudinal ultrasonic wave obtained by using the longitudinal ultrasonic sensor for comparison. The graph GS shows the propagation time of the ultrasonic wave obtained by using the ultrasonic inspection device 80 of the present embodiment. As shown by the graphs GL, GS, the propagation time of each ultrasonic wave starts increasing at time T1 when molten metal is introduced. The propagation time of the longitudinal ultrasonic wave for comparison shown by the graph GL has a large change (noise) including discrete values, as shown by arrow P1. On the other hand, it can be seen that the propagation time of the ultrasonic wave obtained by using the ultrasonic inspection device 80 of the present embodiment shown in the graph GS does not have large noise and changes stably. This indicates that the ultrasonic wave obtained using the ultrasonic inspection device 80 of the present embodiment are stable without being affected so much by the temperature change, Leidenfrost phenomenon, etc. that occur due to high-temperature molten metal coming into contact with the inner wall E2 of the mold 50. In other words, this indicates that the ultrasonic wave obtained using the ultrasonic inspection device 80 of the present embodiment have about the same performance as a transverse ultrasonic wave.

As described above, the ultrasonic inspection device 80 of the present embodiment includes the ultrasonic transducer unit 82 having the output surface S2 disposed facing an object to be inspected, the input surface S1 on which the longitudinal ultrasonic sensor 84 is disposed, and the conversion surface S3 configured to, when the longitudinal ultrasonic wave input through the input surface S1 is reflected by the conversion surface S3, convert the longitudinal ultrasonic wave into a transverse ultrasonic wave such that the transverse ultrasonic wave propagates toward the output surface S2, the conversion surface S3 being tilted at a predetermined angle with respect to the in-plane direction of the output surface S2. The longitudinal ultrasonic sensor 84 having higher heat resistance than a transverse ultrasonic sensor can thus be used, and the heat resistance of an inspection device using the transverse ultrasonic wave can be increased. Since the ultrasonic transducer unit 82 is interposed between the longitudinal ultrasonic sensor 84 and the object to be inspected, the longitudinal ultrasonic sensor 84 can be separated from the object to be inspected, and heat transfer from the object to be inspected to the longitudinal ultrasonic sensor 84 can be reduced or prevented. According to the ultrasonic inspection device 80 of the present embodiment, the thermal conductivity of the ultrasonic transducer unit 82 is set to be lower than that of the object to be inspected. This can reduce or prevent heat transfer from the object to be inspected through the ultrasonic transducer unit 82.

According to the ultrasonic inspection device 80 of the present embodiment, the ratio of the transverse acoustic impedance of the mold 50 to the transverse acoustic impedance of the ultrasonic transducer unit 82 is 2.0±0.1. By providing a suitable difference between the transverse acoustic impedance of the material of the mold 50 (SKD61) and the transverse acoustic impedance of the material of the ultrasonic transducer unit 82, a good balance can be achieved between transmission and reflection of a transverse ultrasonic wave at the interface between the mold 50 and the ultrasonic transducer unit 82, and the accuracy of detection of a reflected wave by the ultrasonic inspection device 80 can be improved.

According to the ultrasonic inspection device 80 of the present embodiment, the coefficient of thermal expansion of the ultrasonic transducer unit 82 is set to be lower than that of the mold 50. This can reduce or prevent deformation of the ultrasonic transducer unit 82 due to heat transfer from the mold 50, and can improve the accuracy of detection of a reflected wave by the ultrasonic inspection device 80.

According to the ultrasonic inspection device 80 of the present embodiment, the ultrasonic transducer unit 82 is made of a Ti-6Al-4V alloy. The ultrasonic transducer unit 82 can thus be produced by a simple method using a known material.

According to the ultrasonic inspection device 80 of the present embodiment, the object to be inspected includes the mold 50 having the internal space CV for forming a molded product, and the molding material 54 introduced into the internal space CV. Therefore, the ultrasonic inspection device 80 can be obtained that can acquire information on the molding material 54 in the mold 50 used in a molding machine such as a die casting machine or an injection molding machine.

B. Other Embodiments (B1) The first embodiment illustrates an example in which 64 titanium is selected for the ultrasonic transducer unit 82 as a material that satisfies all of the three conditions: (1) thermal conductivity, (2) coefficient of thermal expansion, and (3) balance between transmission and reflection of a transverse ultrasonic wave at the interface between the object to be inspected and the ultrasonic transducer unit 82. However, the material of the ultrasonic transducer unit 82 is not limited to the material that satisfies all of the conditions, and need only satisfies at least the condition (1), namely need only have lower thermal conductivity than the object to be inspected etc. In the example of FIG. 3, for example, SUS304 having lower thermal conductivity than SKD61 may be selected. The following condition (4) may be considered in addition to the conditions (1) to (3): (4) having good propagation characteristics of an ultrasonic wave in the ultrasonic transducer unit 82. For example, the material having good propagation characteristic of an ultrasonic wave can be a material having a low attenuation factor of an ultrasonic wave. In the first embodiment, the objects to be inspected include the mold 50, the molding material 54 in the internal space CV of the mold 50, and the mold release agent 52 in the internal space CV of the mold 50. However, the object to be inspected may be only the molding material 54. In other cases, another embodiment of the present disclosure may be an ultrasonic inspection unit that includes the ultrasonic inspection device 80, the control device 90, and the mold 50 provided in a molding machine.

The present disclosure is not limited to the above embodiments, and can be implemented by various configurations without departing from the spirit of the present disclosure. For example, the technical features in each embodiment corresponding to the technical features in each form described in "SUMMARY" can be replaced or combined as appropriate in order to solve some or all of the above issues or achieve some or all of the above effects. When the technical features are not described as essential in the present specification, such technical features can be omitted as appropriate.

What is claimed is:

1. An ultrasonic inspection device inspecting an object to be inspected including molten metal, comprising:
a longitudinal ultrasonic sensor configured to emit and receive a longitudinal ultrasonic wave; and
an ultrasonic transducer unit made of metal and having a shape of a polyhedron, the ultrasonic transducer unit including
an output surface configured to be disposed facing the object to be inspected,
an input surface on which the longitudinal ultrasonic sensor is disposed, and
a conversion surface configured to, when the longitudinal ultrasonic wave input through the input surface is reflected by the conversion surface, convert the longitudinal ultrasonic wave into a transverse ultrasonic wave such that the transverse ultrasonic wave propagates toward the output surface, the conversion surface being tilted at a predetermined angle with respect to an in-plane direction of the output surface, wherein
a thermal conductivity of the ultrasonic transducer unit is lower than thermal conductivity of the object to be inspected, and the thermal conductivity of the ultrasonic transducer unit is 100 W/m· K or less.

2. The ultrasonic inspection device according to claim 1, wherein a ratio of acoustic impedance of the object to be inspected to acoustic impedance of the ultrasonic transducer unit is 0.5±0.1 or 2.0±0.1, acoustic impedance being a physical property value obtained by multiplying a density of an object by a speed of sound.

3. The ultrasonic inspection device according to claim 1, wherein a coefficient of thermal expansion of the ultrasonic transducer unit is lower than a coefficient of thermal expansion of the object to be inspected.

4. The ultrasonic inspection device according to claim 3, wherein the coefficient of thermal expansion of the ultrasonic transducer unit is $20 \times 10^{-6}$/K or less.

5. The ultrasonic inspection device according to claim 4, wherein the coefficient of thermal expansion of the ultrasonic transducer unit is $12 \times 10^{-6}$/K or less.

6. The ultrasonic inspection device according to claim 1, wherein the ultrasonic transducer unit is made of a Ti-6Al-4V alloy.

7. The ultrasonic inspection device according to claim 1, wherein the object to be inspected includes a mold having an internal space for forming a molded product, and a molding material introduced into the internal space.

8. The ultrasonic inspection device according to claim 1, wherein the thermal conductivity of the ultrasonic transducer unit is 50 W/m· K or less.

9. The ultrasonic inspection device according to claim 1, wherein the ultrasonic inspection device is attached to a mold in a molding machine.

10. The ultrasonic inspection device according to claim 9, wherein the molding machine is a die casting machine.

11. The ultrasonic inspection device according to claim 1, wherein the predetermined angle is set based on a longitudinal ultrasonic wave velocity and a transverse ultrasonic wave velocity in the ultrasonic transducer unit.

12. The ultrasonic inspection device according to claim 1, wherein the ultrasonic inspection device inspects at least one of: a state of solidification of the molten metal, or a temperature distribution in the molten metal.

13. An ultrasonic inspection unit, comprising:
- a longitudinal ultrasonic sensor configured to emit and receive a longitudinal ultrasonic wave;
- a mold having an internal space and configured such that a molten metal is introduced into the internal space; and
- an ultrasonic transducer unit made of metal and having a shape of a polyhedron, the ultrasonic transducer unit including
- an output surface disposed facing the mold,
- an input surface on which the longitudinal ultrasonic sensor is disposed, and
- a conversion surface configured to, when the longitudinal ultrasonic wave input through the input surface is reflected by the conversion surface, convert the longitudinal ultrasonic wave into a transverse ultrasonic wave such that the transverse ultrasonic wave propagates toward the output surface, the conversion surface being tilted at a predetermined angle with respect to an in-plane direction of the output surface, wherein
- a thermal conductivity of the ultrasonic transducer unit is lower than thermal conductivity of the mold, and the thermal conductivity of the ultrasonic transducer unit is 100 W/m· K or less.

14. The ultrasonic inspection unit according to claim 13, wherein a ratio of acoustic impedance of the mold to acoustic impedance of the ultrasonic transducer unit is 0.5±0.1 or 2.0±0.1, acoustic impedance being a physical property value obtained by multiplying a density of an object by a speed of sound.

15. The ultrasonic inspection unit according to claim 13, wherein a coefficient of thermal expansion of the ultrasonic transducer unit is lower than a coefficient of thermal expansion of the mold.

* * * * *